US008370455B2

(12) United States Patent
Robinson et al.

(10) Patent No.: US 8,370,455 B2
(45) Date of Patent: Feb. 5, 2013

(54) SYSTEMS AND METHODS FOR MAPPING MEDIA CONTENT TO WEB SITES (75) Inventors: Steven Robinson, Hermosa Beach, CA (US); Alexander Krassel, Encino, CA (US)

(73) Assignee: 24/7 Media, New York, NY (US)

( * ) Notice: Subject to any disclaimer, the term of this patent is extended or adjusted under 35 U.S.C. 154(b) by 1621 days.

(21) Appl. No.: 11/371,611

(22) Filed: Mar. 9, 2006

(65) Prior Publication Data
US 2007/0214234 A1 Sep. 13, 2007

(51) Int. Cl.
*G06F 15/16* (2006.01)
(52) U.S. Cl. ........ 709/218; 709/225; 709/217; 709/226; 709/219; 725/112; 725/120; 725/87; 715/716; 707/10; 707/102
(58) Field of Classification Search .................. 709/218; 725/82, 105
See application file for complete search history.

(56) References Cited

U.S. PATENT DOCUMENTS

| 5,568,181 | A | 10/1996 | Greenwood et al. |
|---|---|---|---|
| 6,006,265 | A * | 12/1999 | Rangan et al. ................. 709/226 |
| 6,070,167 | A * | 5/2000 | Qian et al. ..................... 707/102 |
| 6,076,104 | A * | 6/2000 | McCue .......................... 709/219 |
| 6,154,771 | A | 11/2000 | Rangan et al. |
| 6,522,342 | B1 * | 2/2003 | Gagnon et al. ................. 715/716 |
| 6,847,778 | B1 * | 1/2005 | Vallone et al. .................. 386/68 |
| 6,859,840 | B2 | 2/2005 | Singal et al. |
| 6,963,906 | B2 * | 11/2005 | Portuesi ........................ 709/217 |
| 7,200,857 | B1 * | 4/2007 | Rodriguez et al. .............. 725/87 |
| 7,451,152 | B2 * | 11/2008 | Kraft et al. ....................... 707/10 |
| 2001/0029523 | A1 | 10/2001 | Mcternan et al. |
| 2001/0049826 | A1 * | 12/2001 | Wilf .............................. 725/120 |
| 2002/0026637 | A1 | 2/2002 | Markel et al. |
| 2002/0112247 | A1 | 8/2002 | Horner et al. |
| 2003/0037331 | A1 | 2/2003 | Lee |
| 2003/0233451 | A1 * | 12/2003 | Ludvig et al. ................. 709/225 |
| 2004/0019900 | A1 | 1/2004 | Knightbridge et al. |
| 2004/0078825 | A1 | 4/2004 | Murphy |
| 2004/0128343 | A1 | 7/2004 | Mayer |
| 2004/0139474 | A1 * | 7/2004 | Carro ............................ 725/112 |
| 2005/0034151 | A1 | 2/2005 | Abramson |
| 2005/0034153 | A1 | 2/2005 | Abramson et al. |
| 2005/0044260 | A1 | 2/2005 | Abramson et al. |
| 2007/0011713 | A1 | 1/2007 | Abramson et al. |
| 2007/0186240 | A1 | 8/2007 | Ward, III et al. |

FOREIGN PATENT DOCUMENTS

| WO | WO 95/04974 | 2/1995 |
|---|---|---|
| WO | WO 02/19718 | 3/2002 |

OTHER PUBLICATIONS

PCT International Search Report.
Supplementan European Search Report for related case EP 07 75 1473.

* cited by examiner

*Primary Examiner* — Hua Fan
(74) *Attorney, Agent, or Firm* — Nixon & Vanderhye, P.C.

(57) ABSTRACT

Systems and methods for mapping viewable and non-viewable media to websites are disclosed. Mapping is executed through associated or embedded data, based upon frame and/or time segment of the media. The media-to-browser-destination-data (MBDD) may be embedded in media content, embedded in a transmitted signal, downloaded or pushed to a media playing device, or provided by a graphic overlay. Media players are disclosed that can process the MBDD to launch a browser to a selected web site.

55 Claims, 5 Drawing Sheets

SYSTEMS AND METHODS FOR MAPPING MEDIA CONTENT TO WEB SITES

BACKGROUND OF THE INVENTION

1. Field of the Invention

This invention is directed to systems and methods for mapping media content to web sites. Specifically, this invention is directed to mapping screen locations of viewable and non-viewable media content and objects in viewable media content by means of media time segments and screen locations to web sites.

2. Description of Related Art

In recent years, the delivery of media programs to homes has become increasingly complex and sophisticated. Media programs were once simple viewable programs, such as television shows and movies, and non-viewable programs, such as radio shows, transmitted to antennas over airwaves at certain radio frequencies. As time went on, cable television was introduced, which allowed media content to be transmitted over cables, such as fiber-optic cables, broadening the amount of media content that could be delivered to homes all over the world. The development of satellite transmission of media content also allowed widespread distribution of media content both unencoded and encoded from satellites to various types of satellite dishes. Set top boxes receiving media content now allow for real time play and storage for future play, and transmission of media content has now evolved to transmission over the Internet. In addition to traditional television and set top boxes, home computer users can watch television or listen to radio programs on their computers. The combination of all these distribution capabilities, improved technology and availability of media content such as television and radio presents opportunities for incorporating new advertising methods into media distribution.

Some new methods of advertising in media have been conceived. These include product placements, when an advertiser pays for its product to be displayed in viewable media content or mentioned in audio media content, and graphical overlays, such as pop-ups, crawls, and scrolls, which lay over the viewable media content. Currently, there is some availability of methods to determine the location of an object or graphical overlay. However, there is a need to integrate these methods into superior advertising techniques.

DETAILED DESCRIPTION OF THE INVENTION

Embodiments of the present invention are directed to mapping of media content and objects within the media content to web sites. In certain embodiments of the present invention, the media content is viewable media content and objects within the viewable media content are mapped based upon their screen locations during specific time durations to web sites. In further embodiments, the media content is non-viewable media content or viewable media content and mapping is performed based on the frame or time segment of the media content, and there may be default mapping for part or all of the media content. The mapping may be executed through data externally associated with the media content or data physically embedded in the media content. The embedded/associated data contain information that is used to instruct a browser what web site should be launched during a particular frame or time segment of playing media content.

In embodiments of the present invention, consumers watching viewable media content, for example, television, movies, video, and video files, or listening to media content, for example, radio, mp3 files, and sound files, may interact with the media content to launch a web browser to a specific destination web site or to multiple web sites. The consumer/user may interact by clicking a button on a remote control, activating a pointing device, which may be an advanced pointing device, or through any other method used to interact with a television, computer, set top box, and/or media player. In further embodiments, the consumer/user may interact by voice commands. The launching of the web browser to the specific web site(s) may be based on the time of the media content, for example the time measured in frames, with a certain number of frames per second, for viewable media content, or a time segment of non-viewable media content. For viewable media content, the launching may also be based on (x,y) coordinates of the media content and objects within the media content in addition to the time of the media content. In further embodiments, there may be a default web site that is launched to when there is no web site identified for a particular frame or time segment.

In further embodiments of the present invention, media producers, advertisers, and other content providers may specify the data structure for mapping media time segments and screen locations of viewable media content to websites. They may also specify the data structure for mapping time segments of non-viewable media content to web sites. The data structures taught herein are merely illustrative structures for mapping media content to web sites and are not intended to be limiting. Media playing devices process the data structures into data mapping objects, which are managed into queues and arrays in order to be dynamically evaluated. The media playing devices further can process and manage the data queues, arrays, and mapping objects to properly navigate a browser to a specific web site. As data may be associated with media content and/or embedded in media content (such as with an MPEG stream) manufacturers of media playing devices may load data structures for mapping media time segments as they believe appropriate in accordance with optimal processing for their hardware or software.

Currently, media content have media durations, which are time measurements. Generally, all playing of media content is measured in time and time offsets. Time is the total time of the media content and time offset is the time from the commencement of playing. Viewable media content, which includes, for example, television, movies, video, and video files, uses a Timecode measured in hours, minutes, seconds and frames, with approximately 30 frames per second (fps) for NTSC (National Television Systems Committee) or 25 fps for PAL (Phase Alternation Line, the format used in Europe).

The commencement of viewable media content is zero and time portions (or durations or points) in the viewable media content are measured in HH:MM:SS:FF, or Hours:Minutes: Seconds:Frames. For example, a video whose length is two hours, fifteen minutes, thirty seconds and ten frames would have a duration of 02:15:30:10. A stop of play at any time in the media content would be measured from an origin of 00:00:00:00. For example, if a video were stopped one hour, twelve minutes, fifteen seconds after starting during the twelfth frame of the second, the Timecode would be 01:12:15:12. Sound media content uses a Timecode measured in hours, minutes, seconds and hundredths of seconds, or HH:MM:SS:hh. In further embodiments, the viewable media content may be measured solely with respect to frames. For example, a time portion of the media content may be one or more frames, such as $Frame_1$-$Frame_N$ or [$Frame_2$, $Frame_4$-$Frame_6$, $Frame_8$]. In other words, the structure of a time portion may be any structure that will allow a user to choose a time portion of the media content during which it is desired to launch a browser to a web site.

When viewable media content is playing on a display, the position of each object on the display has a number of (x,y) coordinates corresponding to the width and height from the origin. Generally, the origin of a display is the top left corner, but it is envisioned that the origin could be at any other location, for example, the bottom left corner, top right corner, top left corner, or center of the display.

In embodiments of the invention, a particular video segment could contain any number of objects of which it is desired to know the position. For example, in a television program or movie program, objects may be product placements, objects placed in a viewable media content to advertise themselves to the viewer. Examples could be coffee tables, sofas, shoes, cars, people, drinks, computers, and really anything that an advertiser wanted to show during the program. By way of example only, a sofa could be a product that appears during a time duration of a viewable media content. At least once in the program, the sofa would appear beginning at $HH_1$:$MM_1$:$SS_1$:$FF_1$ and ending at $HH_2$:$MM_2$:$SS_2$:$FF_2$. The sofa could appear any number of times, each time with a particular start time and end time. For example, the viewable media content might use multiple cameras. One camera angle might show the sofa and another camera angle might show a view that does not include the sofa. Switching between angles would start or end viewing of the sofa. The position of the sofa would have a number of (x,y) coordinates defining its area. Simply, the position of the object, sofa in this particular case, could be represented by a rectangle, oval, or other general shape that allows a fairly simple algorithm to determine which coordinates are within the sofa area. It is also possible to map out more complex shapes that more closely track the location of the object or exact (x,y) coordinates where the object appears. In the case of the sofa, if someone were sitting on the sofa, it may be desirable to have only the (x,y) coordinates where the person is not sitting to correspond to the sofa. In this way, the person's clothing could be a different product placement with a different set of (x,y) coordinates.

Figure 1:
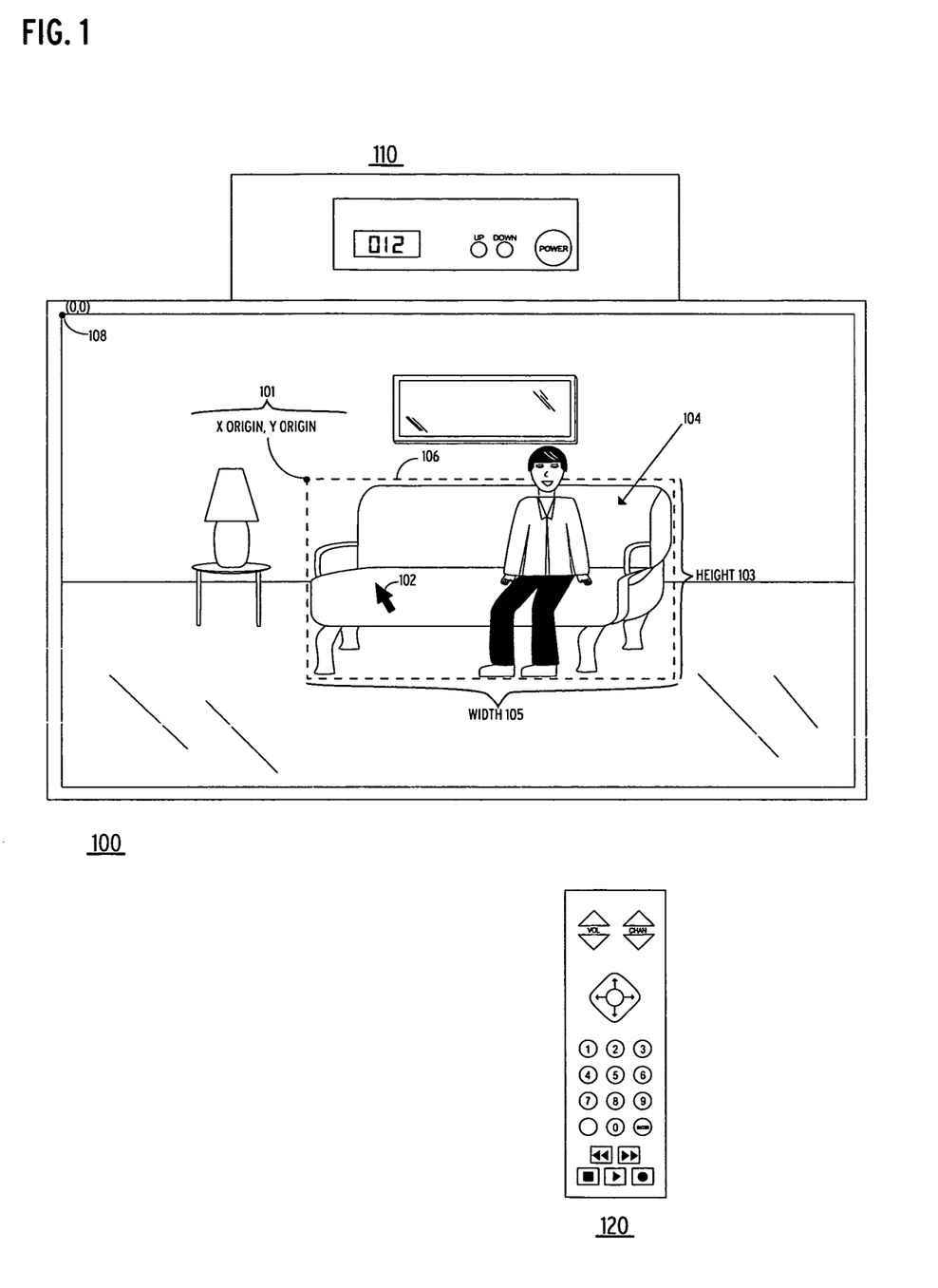
FIG. 1 shows a display, media playing device, and remote control according to an embodiment of the present invention.

FIG. 1 shows a display 100 and media playing device 110 according to an embodiment of the invention. The display 100 may be a television, computer monitor, or any other type of display. The display 100 may be coupled to the media playing device 110 and may be part of the media playing device 110 or separate from the media playing device 110. In FIG. 1, one frame is shown, in which a man is sitting on a sofa 104. In this embodiment, the selection area 106 for the media-to-browser-destination-data (MBDD) is a rectangle. The (x,y) origin 108 of the viewable area is at the upper left of the screen. The origin of the rectangle selection area 106 is at the (x origin, y origin) 101, which is the upper left of the selection area 106. It is measured as a being x origin number of pixels right (or an equivalent coordinate measuring system) of the origin 108 and y origin number of pixels down from the origin 108. The width 105 of the selection area 106 and the height 103 of the selection area complete the rectangle. Also shown in FIG. 1 is a cursor 102 that has been moved to lie over the selection area 106. In certain embodiments, the selection area 106 might change color, darken or lighten, or reverse colors to indicate that the cursor is over that area. In further embodiments a change in color or shading of the selection area 106 might only occur when a button or other interface is activated by a user. In FIG. 1, the media playing device 110 is a set top box, such as would be used to receive cable or satellite television. Use of a set top box is illustrative only, and it is contemplated that any media playing device could be used, as long as it is capable of using the MBDD. In FIG. 1, the media playing device 110 is activated by the remote control 120. Use of a remote control is illustrative only, and it is contemplated that any sort of interface with the media playing device could be used.

The (x,y) coordinates of an object may vary with each frame. Thus, each frame would have its own set of (x,y) coordinates corresponding to each desired object. Having the data to know when the object appears and the rectangle or other shape in which it appears will allow a remote control or other pointing device to not only act on the media content playing in a specific time segment (e.g., pause, etc.), but also a remote control or pointing device will allow selection of a specific object area within the time duration. In further embodiments, the activation of objects may be by voice commands. This will allow recognizing of embedded product placements or objects, which will allow consumers to do media commerce and advertisers to get more opportunities from product placements.

Figure 2A:
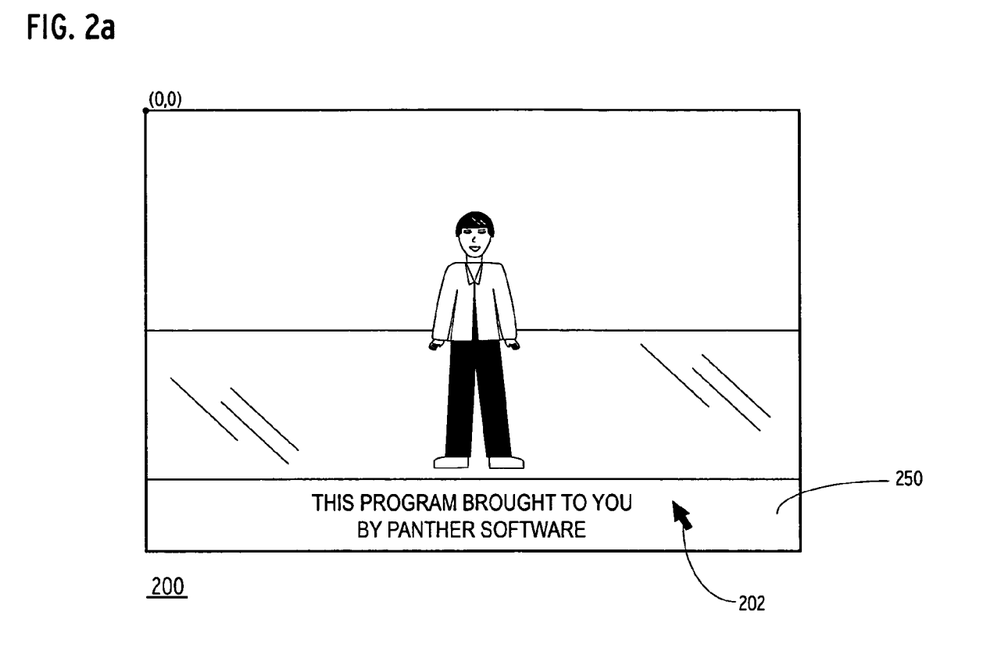
FIG. 2A shows a screen shot of a display with a crawl graphical overlay according to an embodiment of the present invention.
Figure 2B:
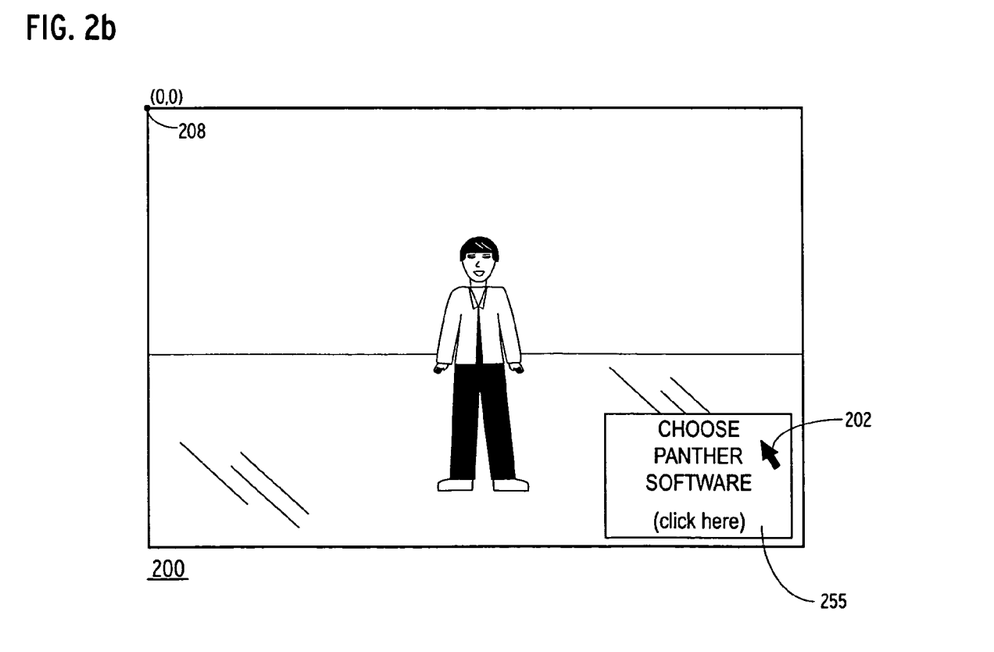
FIG. 2B shows a screen shot of a display with an image graphical overlay according to an embodiment of the present invention.

Graphical overlays are displays placed over playing video media content. Video (e.g., television, video, and video data files) takes up an (x,y) rectangular area on a single z-axis, and graphical overlays are viewable objects in a subset of the (x,y) rectangular area of the video in a z-axis that appears above the video. In addition to using a remote control to recognize product placements or objects, as discussed above, it is therefore possible to use a remote control or pointing device or other interface, such as one allowing voice commands, to interact with graphical overlays based on the time duration during which they appear as well as their rectangular coordinates. This will allow consumers to do media commerce and advertisers to get more opportunities from graphical overlays. FIGS. 2A and 2B show graphical overlays placed over the playing video media content. As shown in FIG. 2A, a crawl 250 is on the z-axis that appears over the video on the display 200, which may be part of the media playing device. In FIG. 2B, a pop-up 255 is on the z-axis that appears over the video. In either scenario, a cursor 202 may be used to map a browser to a website. In alternative embodiments, the graphical overlay may be the only item that is associated with MBDD. Thus, there may be no need to have a cursor, and the user may merely activate a button on a remote control or another interface to launch the browser.

In embodiments of the invention, a consumer may launch a browser to a destination website, including, but not limited to, a website correlated to information provided on television or radio (e.g., embedded product placements), relating to a traditional advertisement or commercial, and/or responding to a pop-up, scroll or crawl displayed as a graphical overlay during a show. In further embodiments, a commercial may be considered media content. For example, during commercial breaks, a user may launch a browser to a destination web site correlated to information in the commercial. Generally, a commercial would contain data to launch the browser to one web site, the web site for the advertised product/services, but it is possible that data could be included to launch to multiple web sites, either at the same time or during different frames or time segments of the commercial.

Viewable media content and non-viewable media content according to the present invention may come in multiple forms. For example, media content includes broadcast television, satellite television, cable television, MPEG files, Microsoft Windows™ media files, Windows™ video files, other types of video files, MP3 files, AVI files, sound files, broadcast radio, satellite radio, and so forth. Graphical overlays are also included as media content, for example, images, videos, scrolls, crawls, etc. overlaid for display on a viewable screen's area of a display.

To support mapping specific segments of media content and objects to different web sites, media content in embodiments of the present invention is associated with data regarding the content that is being viewed or listened to by the user. The data associated with the media content is processed in a procedure that supports dynamic mapping of time sequences and, where desired, (x,y) coordinates of viewable media content and objects within the viewable media content to web sites.

The methods of the present invention for mapping media content to web sites may be implemented on any media player. For example, and in no way by limitation, media players to implement the methods include television set top boxes (e.g., cable or satellite boxes), personal computers, digital video recorders (DVR, e.g., a TIVO™ recorder), a cable card that resides inside a television or monitor, MP3 and other audio and video file players (e.g., an iPOD™ player), video phones, video and/or audio cassette players, optical disk players (e.g., DVD and CD players), and any other type of video player. The media player may also be integrated into a television or monitor itself.

The media player of the present invention contains software to launch an Internet browser, for example, Microsoft Windows™ Internet Explorer™ or Mozilla Firefox™ Browser. The browser software may be integrated into the media player apparatus itself. For example, if the media player apparatus is a set top box, DVR or similar device, or cable card or similar device, the browser software may be included in the software or firmware loaded onto the device. The software or firmware could be loaded at the manufacturing facility or other location prior to use by the purchaser. Alternatively, it could be downloaded over the Internet as an update or loaded onto the device in any other feasible way. When a personal computer is used, the browser software might be included in an operating system providing media viewing services or might be software loaded onto the computer separately, by disk, Internet, flash drive, etc. Any other type of media player described above, or capable of playing media content, may include browser software that would be able to launch Internet web sites as long as the media player can connect to the Internet, through wired or wireless means.

Figure 3:
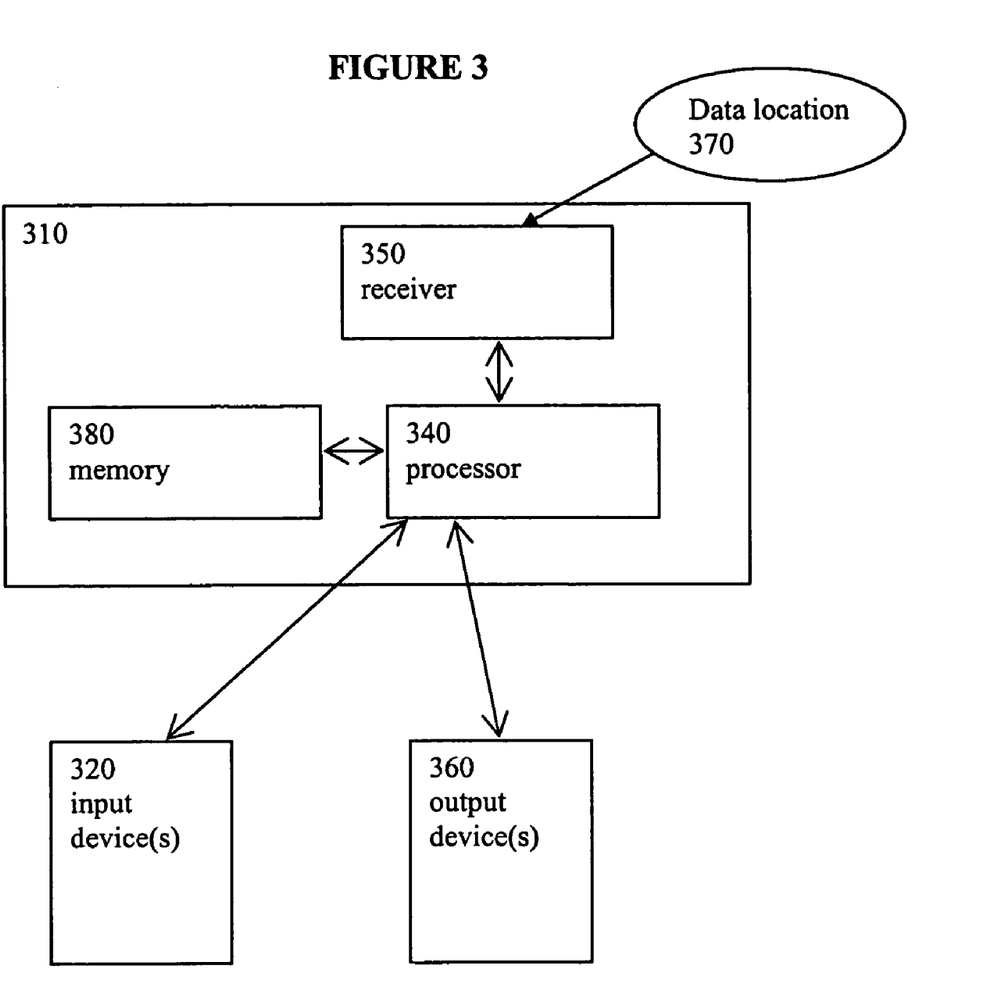
FIG. 3 illustrates a media playing device according to an embodiment of the present invention.

As shown in FIG. 3, in embodiments of the present invention, the media playing device 310 includes a receiver 350 to receive media content/files and media-to-browser-destination-data (MBDD) from data locations 370. The receiver 350 may receive the media content and MBDD from the same or different data locations 370. The receiver 350 is in communication with a processor 340, which processes the MBDD and media content, as well as receiving requests from user input device(s) 320. The input device(s) 320 may include pointing devices, such as a mouse, keyboard, remote control, or laser pointer. In addition or alternatively, user input may be via a touch screen display, which would also be considered an input device even though it may be part of a display that is an output device. The user input may be by voice commands through a microphone or other device. The processor 340 is in communication with one or more output devices 360, such as a display, television, speakers, headphones, etc. The processor 340 is also in communication with a memory 380, which can store the MBDD and/or the media content. As used herein, memory may refer to any type of storage device that may store the MBDD and/or the media content, including, without limitation, a semiconductor memory or hard drive. Although FIG. 3 shows some of the components within the media playing device 310 and some outside the media playing device 310, this embodiment is merely illustrative. For example, the input device(s) 320 and/or the output device(s) could be located within the media playing device 310 or partially within the housing of the media playing device 310 or separate from the media playing device 310.

Figure 4:
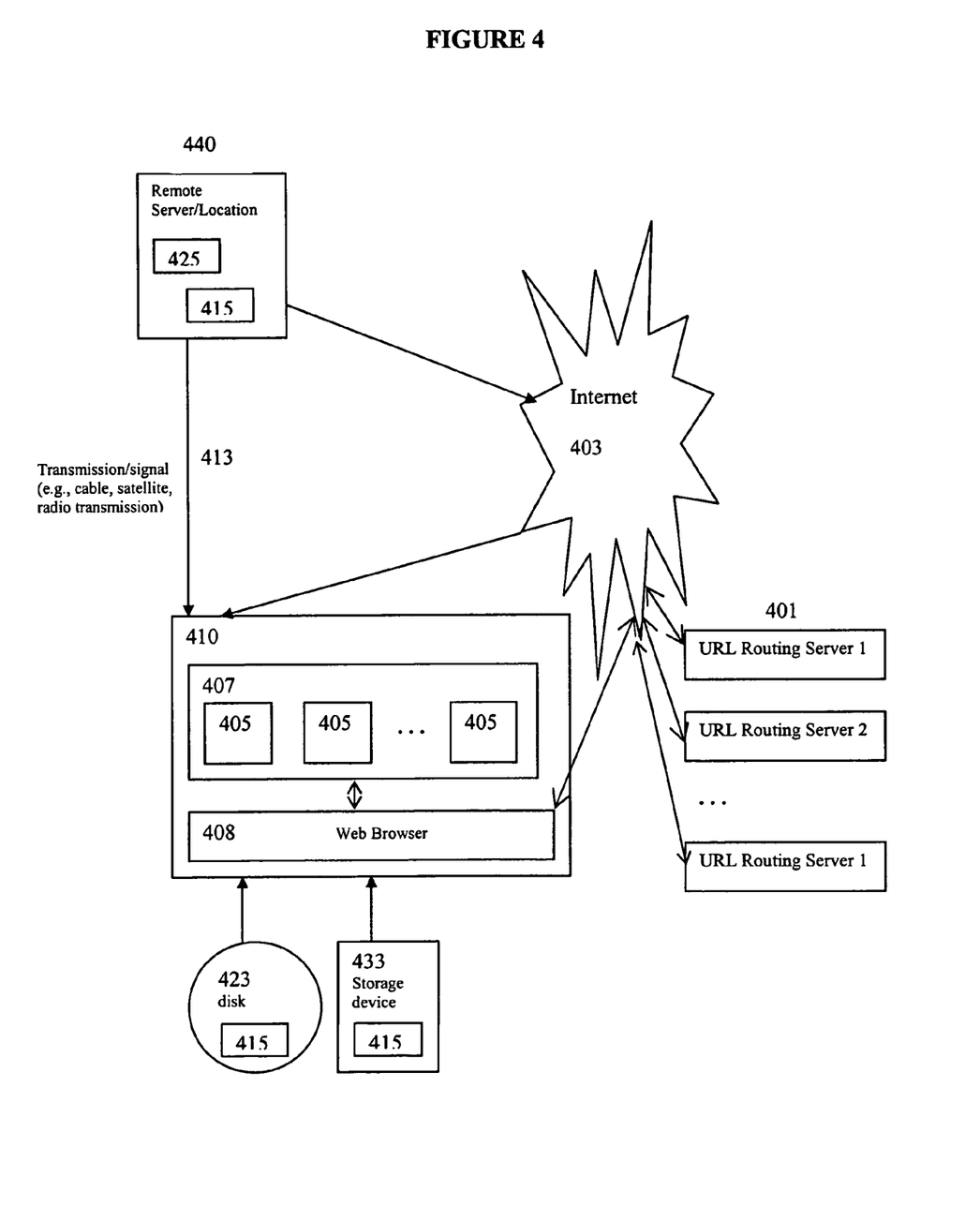
FIG. 4 illustrates data flow according to an embodiment of the present invention.

In embodiments of the present invention, media-to-browser-destination-data (MBDD) is used to map the media content to particular web sites. As shown in FIG. 4, MBDD may arrive to a media playing device in a variety of ways. MBDD may be embedded in media content or may be supplied separately. For example, as shown in FIG. 4, MBDD may be embedded in media content (e.g., a media file), such as a video, music file or MPEG file. The media content with embedded MBDD 415 may be sent to the media player 410 over the Internet 403, by cable or satellite or other (e.g., radio) transmission 413, may be located on a disk 423, such as an optical storage disk or DVD, or other storage device 433, such as a flash drive, and downloaded to the media player 410 from that disk 423 or storage device 433, or may be passed to the media player 410 in any other feasible way. In this embodiment, the media playing device 410, such as a set top box, personal computer, or other type of media playing device contains software to decode and read the embedded MBDD from the video, music or MPEG file. For example, in an MPEG file the MBDD or equivalent data may be embedded in a transport stream identified by a Packet Identifier (PID) and processed by the software. The software reads and extracts the data from the transport stream and passes the MBDD into a data queue for use. As shown in FIG. 4, and as described below the MBDD is processed into an in-memory collection of data objects in the physical memory 407 of the media playing device 410. The MBDD contains one or more Advertisement Data blocks 405, which will be discussed further below. The MBDD provides the required information to the media player for proper browser navigation during play of any frame or time segment of the media content. The web browser 408, which is on the media player device, is launched and is mapped to the requested URL Routing Server 401 over the Internet 403 or private network based on the MBDD.

Also as shown in FIG. 4, in further embodiments, MBDD may be embedded in a signal being transmitted 413 to the media playing device 410, such as a signal from a television or radio broadcaster. For example, in an MPEG file (or MPEG transport stream) the MBDD could be identified and filtered by a Packet Identifier (PID) by the media playing device 410. The extracted data could be loaded into an in-memory collection of data objects that may be processed as previously described. The signal could also be transmitted from a media content provider that provides media content over the Internet. For example a personal computer may have a software component that decodes and filters MBDD from IP packets. The extracted data could be loaded into an in-memory collection of data objects that may be processed as previously described. The media player 410 then processes the transmission embedded MBDD 425 for use, similar to how the file embedded MBDD 415 is processed, and as discussed further below. During viewing of or listening to media content transmitted over the signal, the MBDD provides the required information to the media player for proper browser navigation during play of any frame/time segment.

In further embodiments, MBDD may be downloaded by the media playing device or pushed to the media playing device in advance, for example over the Internet 403. For example, the media playing device may periodically download MBDD from a remote server/location 440, such as a web site or private network, and maintain that MBDD for future use. During viewing or playing of media content associated with the MBDD, the MBDD will provide the required information to the media player for proper browser navigation during play of any frame or time segment of the media content.

In further embodiments, MBDD may be provided by a graphical overlay, such as images, videos, scrolls, crawls, etc. When the graphical overlay information is provided to the media player, the MBDD code is included with the play out instructions for the graphical overlay. The graphic overlay may be provided via any one of the methods discussed above, e.g., Internet, cable or satellite broadcast, disk or other storage device, or by any other suitable method. During viewing of the graphical overlay, the MBDD provides the required information for mapping from the graphical overlay to a particular web site.

MBDD may be in any format, including binary, that can be processed by a media playing device according to the present invention. For example, MBDD may be coded in any desired language, including, but not limited to, C, C++, C#, .Net, XML, and Java. TABLE 1 is an example set of MBDD shown in XML format. The descriptions and tags provided in the XML sample in Table 1 are lengthened for ease of readability. Actual MBDD may be compiled or abbreviated to be lighter in weight to reduce transport and/or processing overhead.

TABLE 1

```
<MBDD>
    <Media_Publisher
        Publisher="CBS Television"
        Name="Two and a Half Men"
        Version="Episode 4 - 2005"
        Length="00:24:00:00"
        URL_Default="http://www.panthersoft.com/mbdd-[optional parameters]"
        Default_Lookup="[Default GUID key goes here]" >
    <Advertisement_Data
        Scene_Name="Charlie laying on sofa with magazine"
        Time_Offset="00:05:10:10"
        Duration="00:01:03:10"
        XOrigin="0"
        Width="100"
        YOrigin="0"
        Height="100"
        URL_Routing_Server="http://www.panthersoft.com/mbdd-[optional
parameters]"
        Unique_Lookup_Key_Value="[GUID goes here]" />
    <Advertisement_Data
        Scene_Name="Charlie laying on sofa with magazine"
        Time_Offset="00:05:15:10"
        Duration="00:00:35:00"
        XOrigin="250"
        Width="100"
        YOrigin="250"
        Height="100"
        URL_Routing_Server="http://www.panthersoft.com/mbdd-[optional
parameters]"
        Unique_Lookup_Key_Value = "[Different GUID goes here]" />
    </Media_Publisher>
<Custom_Data>
        <!--Area for media player device (e.g., set top box) manufacturers to extend the
        MBDD data format-->
</Custom_Data>
</MBDD>
```

TABLE 1 shows an example of MBDD according to the present invention. The MBDD includes information about the media. For example, in TABLE 1, the media publisher, title of the media content, version information, and length of the media content are included. Additional information or less information may be included. In the MBDD shown in TABLE 1, there is a default URL and a default GUID (globally unique identifier). Also included in the MBDD are two "Advertisement Data" blocks. Each block includes information for instructing the media playing device what web site to launch at a particular time and location. For example, in both of the "Advertising_Data" blocks in the MBDD shown in TABLE 1, included are the scene name, time offset and duration of the object (e.g., product placement), (x,y) coordinates, which include the distance from the origin to start a rectangle and the width and height of the rectangle that can be selected to launch to the URL Routing Server passing the optional GUID if supplied. In the first "Advertisement Data," the rectangle starts at (0,0) and has a width and height of 100. The MBDD also may include an area for custom data, for example, for the media player device manufacturers to extend the data format.

In embodiments of the present invention, the media playing device reads and loads the MBDD data structure into memory when media content is loaded for viewing, when a media broadcast takes place, during a channel change, or in advance by downloading all information from the Internet for broadcasts. A graphical overlay placed on the media playing device that plays independently of the media content may also include the same data in its file structure to be passed to the media playing device.

During the scene commencing at the "Time Offset" shown in TABLE 1 and ending at the conclusion of the "Duration" period, activating the proper interface, such as a browser button on a remote control or a button on a media player, will cause the media player to send a look up request to the "URL Routing Server" passing the "Unique Lookup Key Value" to a URL Routing Server. The URL Routing Server performs a lookup using the Unique Lookup Key Value received from the media player. The URL Routing Server returns the web site destination to the media playing device, which launches the browser with the URL to the web site destination. Similarly, the browser on the media playing device can also pass the Unique Lookup Key Value on the URL Routing Server and be forwarded to the web site.

Bu using the Unique Lookup Key Value as a mapping mechanism, the ultimate browser destination web site can be changed at the URL Routing Server thereby eliminating the need to change any data in a physical media file. This technique also allows for last minute web site destination changes without having to resend MBDD to a media player prior to a broadcast.

In further embodiments, a laser, or other pointing device or user interface, allows for supporting multiple product placements in the same time segment in viewable media content.

Using a Unique Lookup Key Value in the MBDD allows for future flexibility of modification of the ultimate web site to be mapped to, but without modification of an entire media file. For example, during the initial publication of media content, such as a national broadcast run of a viewable show distributed in a media file format, the ultimate browser navigation destination may be sold for a nationally advertised product. Years later, during syndication and local showing of the same media file, the ultimate browser navigation destination could be resold for a different web site destination.

Figure 5:
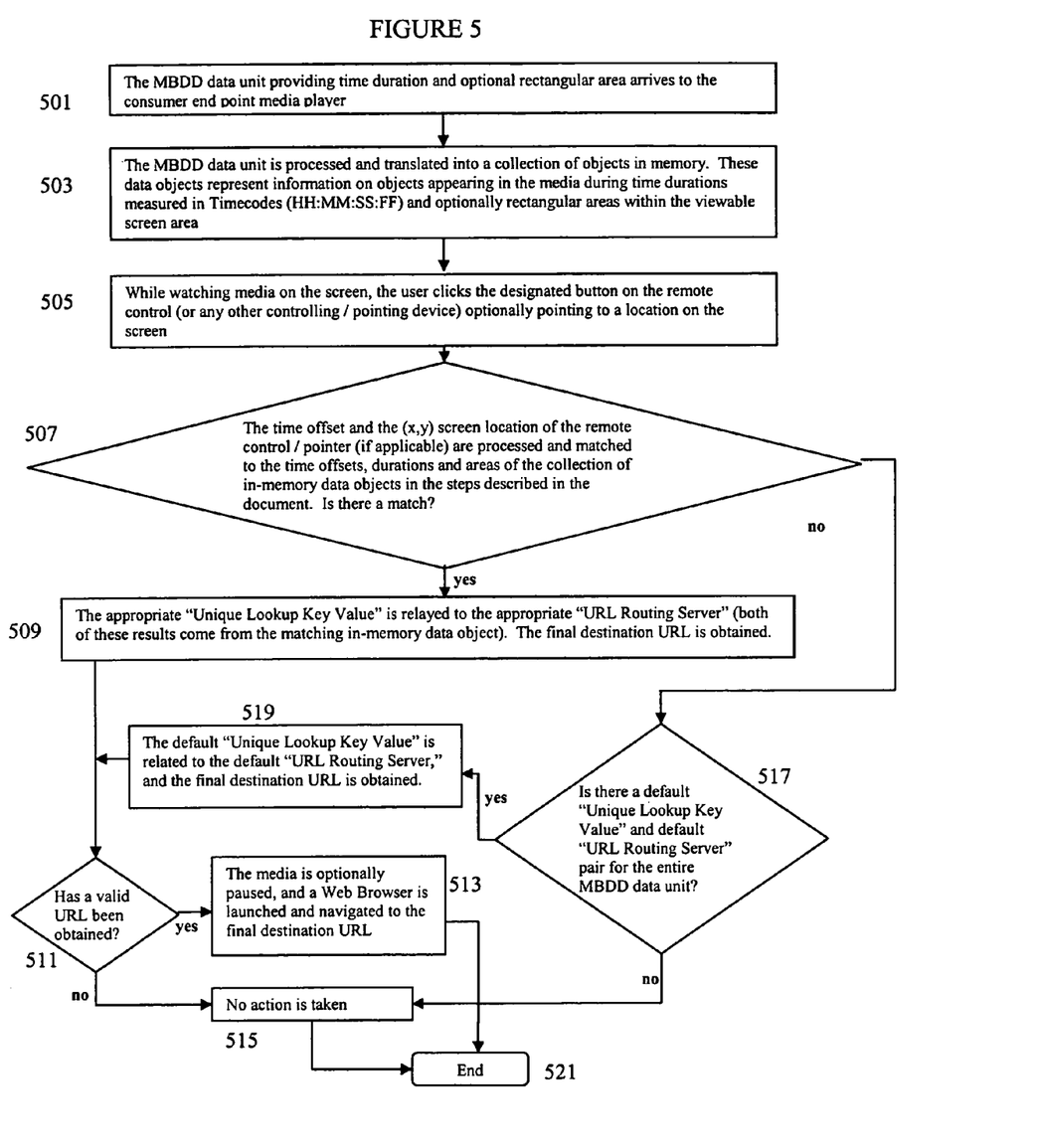
FIG. 5 illustrates a flowchart for operation of a media playing device according to an embodiment of the present invention.

FIG. 5 shows an example flow chart for the processing of MBDD data in an embodiment of the present invention. At 501, the MBDD data unit providing time duration and optional rectangular area arrives to the consumer end point media player. The rectangular area, or (x,y) coordinates, may be shaped in any desired way that allows selection of the shape. At 503, the MBDD data unit is parsed and translated into a collection of objects in memory. These data objects represent information on objects appearing in the media content during time durations measured in Timecodes (HH:MM:SS:FF) and optionally areas within the viewable screen area. The software or firmware running on the media playing device converts the data into an internal in-memory lookup table that for each "Advertisement Data" block, for example as shown in TABLE 1, maps the time offset from the beginning of the current program and the duration for this block to the rest of the information provided in the "Advertisement Data" block. The "Advertisement Data" block can of course be named something completely different, such as "Product Placement Data." The optional (x,y) screen location information, if present in any or all of the "Advertisement Data" blocks, may also be stored in internal data objects in the media playing device's memory. As a result, all the lookup information describing all of the "Advertisement Data" blocks contained in the MBDD data unit for the current media program is contained in an in-memory collection of data objects in the physical memory of the media playing device.

At 505, while watching media content on the screen, the user clicks the designated button on the remote control (or any other controlling/pointing device) optionally pointing to a location on the screen. It is possible that the entire screen at a particular point may be designated to map to a single web site, so it would not be necessary to point at any object. In addition, it may be possible for the background area, or areas where data allowing mapping to a web site is not included, to have a default web site that launches upon activation of a controller. When the user initiates the browser navigation on his/her media player, the matching "Advertisement Data" block gets resolved by looking up the current offset of the media content in the internal in-memory lookup table. At 507, the time offset and the (x,y) screen location of the remote control/pointer (if applicable) are processed and matched to the time offsets, durations and areas of the collection of in-memory data objects. The process of finding the match is done as follows: (1) the correct subset of Advertisement Data Blocks is obtained by finding the resulting subset of all the in-memory objects for which the time of the user event occurs within the time interval between the time offset and the time offset plus duration. (2) If the resulting subset is a non-empty subset the resulting subset may be further narrowed by comparing the (x,y) screen location of the user event to the areas provided by the data objects in the resulting subset. If a match based on an (x,y) screen location is found, the system proceeds with the match as the selected matching entry. If no match based on location is found the first match based on time, the closest match to the (x,y) coordinates or any match based on time may be utilized. As a result of these steps if a matching entry is found (an entry that covers the time interval during which the browser navigation request has occurred), then the system proceeds to 509, where the appropriate "Unique Lookup Key Value" is relayed to the appropriate "URL Routing Server" (both of these results come from the matching in-memory data object). The final destination URL is obtained. The URL Routing Server resolves the "Unique Lookup Key" to a particular URL string, which is returned back to the media playing device. At 511, it is determined whether a valid URL has been obtained. If yes, at 513, the media content is optionally paused, and a Web Browser is launched and navigated to the final destination URL. The media content could be paused when pausing is supported by the media device player, such as a DVD player or a digital video recorder. The pausing could be automatic or an option of the user. If at 511, a valid URL is not obtained, in 515 no action is taken, which is the end 521 of the sequence. Alternatively, an error message could be provided, for example "no URL available."

If in 507 a matching entry is not found for the current offset/screen location, it is determined in 517 if there is a default "Unique Lookup Key Value" and default "URL Routing Server" pair for the entire MBDD data unit. One potential use of a default "URL Routing Server" and "Unique Lookup Key Value" would be to show a web page of all advertisers or upcoming episodes, etc. Alternatively, no action could be performed, depending on the user preferences and/or the media playing device functionality. Still in further embodiments, the media playing device may have a default "Unique Lookup Key Value" and default "URL Routing Server." If there is a default "Unique Lookup Key Value" and default "URL Routing Server" pair, at 519, the default "Unique Lookup Key Value" is relayed to the default "URL Routing Server," and the final URL is obtained. Then the system would proceed as from 509 to 511 to determine if a valid URL has been obtained, and so forth, until the end 521.

Once media content is concluded, all of the corresponding MBDD in-memory data objects for the media program may be discarded from the device's memory. In further embodiments, if the media player pauses the media content in progress as it navigates the browser to the ultimate destination, then all of the time offsets for this program inside the matching in-memory structures may be adjusted accordingly, so that when the user resumes the viewing, the following scenes also remain navigable. Also, in further embodiments MBDD embedded in a transport stream such as an MPEG transport stream may be discarded and loaded when the user changes a television channel.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of mapping media content to a web site comprising:
receiving media content at a media player in communication with a display screen, wherein the media content is viewable media content;
receiving media-to-browser-destination-data, wherein the media-to-browser-destination-data includes (a) time duration data indicating a time portion of the viewable media content; (b) location data indicating a selectable display location in the viewable media content that displays on the display screen during the time portion, wherein the selectable display location is a display location for which a destination web site is desired to be launched if selected by a user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server;
processing the media-to-browser-destination-data into a collection of objects in the memory of the media player;
playing the media content on the display screen in communication with the media player;
during the display of the media content, receiving a user input from a user input device in communication with the media player, wherein the user input selects a selected screen location of media content being displayed on the display screen during a selected time portion of the displayed media content;
determining whether the selected screen location and selected time portion of the user input match both the time portion indicated by the time duration data and the selectable display location indicated by the location data, respectively;
if the selected screen location and selected time portion of the user input match both the time portion indicated by the time duration data and the selectable display location indicated by the location data, respectively, passing the unique lookup key value to the URL routing server at the URL routing server address;
receiving the web site destination from the URL routing server to the media player; and
launching a browser program to the web site destination such that the web site located at the web site destination is displayed on the display screen.

2. The method of claim 1, wherein the data indicating a display location includes one or more sets of (x,y) coordinates.

3. The method of claim 1, wherein the data indicating a display location includes an (x,y) origin value, a width value, and a height value.

4. The method of claim 1, wherein the display location is shaped in a shape selected from the group consisting of a rectangle, an ellipse, a polygon, and a triangle.

5. The method of claim 1, wherein the user input includes data obtained from selecting the display location using a pointing device.

6. The method of claim 5, wherein the pointing device is selected rom the group consisting of a mouse, a keyboard, a remote control, a laser pointer, and a voice input device.

7. The method of claim 1, wherein the time duration data includes a time offset value and a duration value.

8. The method of claim 7, wherein the time offset value and the duration value are in a format selected from the group consisting of HH:MM:SS:FF, HH:MM:SS:hh, and a format using only frame numbers.

9. The method of claim 7, further comprising receiving a pause command from the user input device and adjusting the time offset based on the pause command.

10. The method of claim 1, further comprising displaying a graphical overlay on the display screen during display of the media content, wherein the selectable display location is included in a portion of the display screen where the graphical overlay is being displayed.

11. The method of claim 10, wherein the graphical overlay is selected from the group consisting of a pop-up, a scroll, and a crawl.

12. The method of claim 10, wherein the graphical overlay is on a z-axis displaying above the z-axis of the media content being displayed.

13. The method of claim 1, wherein the time portion indicated by the time duration data includes one or more frames of the media content.

14. The method of claim 1, wherein the media playing device is a set top box.

15. The method of claim 1, wherein the media playing device is a computer.

16. The method of claim 1, wherein the media playing device is a television.

17. The method of claim 1, wherein the receiving of media-to-browser-destination-data includes receiving data transmitted by a transmission method selected from the group consisting of Internet transmission, cable transmission, radio transmission and satellite transmission.

18. The method of claim 1, wherein the media-to-browser-destination-data is received prior to the receiving of the media content.

19. The method of claim 1, wherein the media-to-browser-destination-data is embedded in a transmission signal.

20. The method of claim 1, wherein the media content is played on the media playing device prior to receiving the entire media content.

21. The method of claim 1, wherein the selectable display location varies in its location on the display screen within multiple frames of the viewable media content.

22. The method of claim 1, wherein the media-to-browser-destination-data is downloaded by the media playing device or pushed to the media playing device in advance of receiving the media content.

23. The method of claim 1, further comprising;
converting the collection of objects into an internal memory lookup table that includes one or more data blocks.

24. The method of claim 23, wherein each of the more than one data blocks contains a set of destination data indicating a destination web site to be launched during playback of the media content when a particular unique lookup key value has been sent by the media player to the URL routing server.

25. The method of claim 24, wherein the destination websites indicated in at at least two of the more than one data blocks are different web sites.

26. The method of claim 24, wherein the destination websites indicated in at at least two of the more than one data blocks are the same web sites.

27. The method of claim 24, wherein the one or more data blocks include a default data block including destination data indicating a destination web site to be launched during playback of the media if the selected screen location and selected time portion of the user input does not match both the time portion indicated by the time duration data and the selectable display location indicated by the location data, respectively.

28. The method of claim 1, further comprising pausing the media content when the web site located at the web site destination is displayed on the display screen.

29. The method of claim 1, further comprising discarding the collection of objects from the memory after the media content is concluded.

30. A program code storage device, comprising:
a machine-readable storage medium;
machine-readable program code, stored on the machine-readable storage medium, the machine-readable program code having instructions to:
receive media content at a media player in communication with a display screen, wherein the media content is viewable media content;
receive media-to-browser-destination-data, wherein the media-to-browser-destination-data includes (a) time duration data indicating a time portion of the viewable media content; (b) location data indicating a selectable display location in the viewable media content that displays on the display screen during the time portion, wherein the selectable display location is a display location for which a destination web site is desired to be launched if selected by a user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server;
process the media-to-browser-destination-data into a collection of objects in the memory of the media player;
play the media content on the display screen in communication with the media player;
during the display of the media content, receive a user input from a user input device in communication with the media player, wherein the user input selects a selected screen location of media content being displayed on the display screen during a selected time portion of the displayed media content;
determine whether the selected screen location and selected time portion of the user input match both the time portion indicated by the time duration data and the selectable display location indicated by the location data, respectively;
if the selected screen location and selected time portion of the user input match both the time portion indicated by the time duration data and the selectable display location indicated by the location data, respectively, pass the unique lookup key value to the URL routing server at the URL routing server address; and
launch a browser program to the web site destination such that the web site located at the web site destination is displayed on the displayed screen.

31. The program code storage device of claim 30, wherein the data indicating a display location includes one or more sets of (x,y) coordinates.

32. The program code storage device of claim 30, wherein the data indicating a display location includes an (x,y) origin value, a width value, and a height value.

33. The program code storage device of claim 30, wherein the user input includes data obtained from selecting the display location using a pointing device.

34. The program code storage device of claim 30, wherein the time duration data includes a time offset value and a duration value.

35. The program code storage device of claim 30, wherein the time portion indicated by the time duration data includes one or more frames of the media content.

36. The program storage device of claim 30, further comprising displaying a graphical overlay on the display screen during display of the media content, wherein the selectable display location is included in a portion of the display screen where the graphical overlay is being displayed.

37. The program code storage device of claim 30, wherein the media playing device is selected from the group consisting of a set top box, a television, a portable media player, and a computer.

38. The program code storage device of claim 30, wherein the media-to-browser-destination-data is received prior to the receiving of the media content.

39. The program code storage device of claim 30, wherein the machine-readable program code further has instructions to convert the collection of objects into an internal memory lookup table that includes one or more data blocks.

40. The program code storage device of claim 39, wherein the one or more data blocks include a default data block including destination data indicating a destination web site to be launched during playback of the media if the selected screen location and selected time portion of the user input does not match both the time portion indicated by the time duration data and the selectable display location indicated by the location data, respectively.

41. An apparatus comprising:
a media player;
a display screen in communication with the media player;
a user input device in communication with the media player;
a receiver in the media player to receive media content, wherein the media content is displayed on the display screen, and to receive media-to-browser-destination-data, wherein the media content is viewable media content;
a memory to store the media-to-browser-destination-data, wherein the media-to-browser-destination-data includes (a) time duration data indicating a time portion of the viewable media content; (b) location data indicating a selectable display location in the viewable media content that displays on the display screen during the time portion, wherein the selectable display location is a display location for which a destination web site is desired to be launched if selected by the user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server;

a processor in communication with the memory and the receiver to process the media-to-browser-destination-data into a collection of objects in the memory and to process user input from the user input device, wherein the user input selects a selected screen location of media content being displayed on the display screen during a selected time portion of the displayed media content, wherein the processor further determines whether the selected screen location and selected time portion of the user input match both the time portion indicated by the time duration data and the selectable display location indicated by the location data, respectively;

a transmitter to pass the unique lookup key value to the URL routing server at the URL routing server address if the selected screen location and selected time portion of the user input match both the time portion indicated by the time duration data and the selectable display location indicated by the location data, respectively;

wherein the receiver further receives the web site destination from the URL routing server; and wherein the display screen displays the web site located at the web site destination.

42. The apparatus of claim 41, wherein the data indicating a display location includes one or more sets of (x,y) coordinates.

43. The apparatus of claim 41, wherein the data indicating a display location includes an (x,y) origin value, a width value, and a height value.

44. The apparatus of claim 41, further including a housing, wherein the display screen and the media player are both at least partially within the housing.

45. The apparatus of claim 41, wherein the time duration data includes a time offset value and a duration value.

46. The apparatus of claim 41, wherein the time portion indicated by the time duration data includes one or more frames of the media content.

47. The apparatus of claim 41, wherein the user input device is a pointing device.

48. The apparatus of claim 47, wherein the pointing device is selected from the group consisting of a mouse, a keyboard, a remote control, a laser pointer, and a voice input device.

49. The apparatus of claim 41, wherein the receiver is adapted to receive media-to-browser-destination-data by a transmission method selected from the group consisting of Internet transmission, cable transmission, radio transmission and satellite transmission.

50. A method of mapping media content to a web site comprising:

receiving media content at a media player in communication with a display screen, wherein the media content is viewable media content;

receiving media-to-browser-destination-data, wherein the media-to-browser-destination-data includes (a) time duration data indicating a time portion of the viewable media content; (b) location data indicating a selectable display location in the viewable media content that displays on the display screen during the time portion, wherein the selectable display location is a display location for which a destination web site is desired to be launched if selected by a user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server, wherein the media-to-browser-destination-data is downloaded by the media playing device or pushed to a media playing device in advance of the receiving the media content;

processing the media-to-browser-destination-data into a collection of objects in the memory of the media player;

playing the media content on the display screen in communication with the media player;

during the display of the media content, receiving a user input from a user input device in communication with the media player, wherein the user in put selects a selected screen location of media content being displayed on the display screen during the selected time portion of the displayed media content;

determining whether the selected screen location and selected time portion of the user input match both the time portion indicated by the time duration data and the selectable display location indicated by the location data, respectively;

if the selected screen location and selected time portion of the user input match both the time portion indicated by the time duration data and the selectable display location indicated by the location data, respectively, passing the unique lookup key value to the URL routing server at the URL routing server address;

receiving the web site destination from the URL routing server to the media player; and launching a browser program to the web site destination such that the web site located at the web site destination is displayed on the display screen.

51. A method of mapping media content to a web site comprising:

receiving media content at a media player in communication with a display screen, wherein the media content is viewable media content;

receiving media-to-browser-destination-data, wherein the media-to-browser-destination-data includes (a) time duration data indicating a time portion of the viewable media content; (b) location data indicating a selectable display location in the viewable media content that displays on the display screen during the time portion, wherein the selectable display location is a display location for which a destination web site is desired to be launched if selected by a user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server, wherein the media-to-browser-destination-data is downloaded by the media playing device or pushed to a media playing device in advance of the receiving the media content;

processing the media-to-browser-destination-data into a collection of objects in the memory of the media player;

converting the collection of objects into an internal memory lookup table that includes one or more data blocks, wherein each of the more than one data blocks contains a set of destination data indicating a destination web site to be launched during playback of the media content when a particular unique lookup key value has been sent by the media player to the URL routing server;

playing the media content on the display screen in communication with the media player;

during the display of the media content, receiving a user input from a user input device in communication with the media player, wherein the user input selects a selected screen location of media content being displayed on the display screen during a selected time portion of the displayed media content;

determining whether the selected screen location and selected time portion of the user input match both the time portion indicated by the time duration data and the selectable display location indicated by the location data, respectively;

if the selected screen location and selected time portion of the user input match both the time portion indicated by the time duration data and the selectable display location indicated by the location data, respectively, passing the unique lookup key value to the URL routing server at the URL routing server address;

receiving the web site destination from the URL routing server to the media player; and launching a browser program to the web site destination such that the web site located at the web site destination is displayed on the display screen.

52. The method of claim 51, wherein the destination websites indicated in at at least two of the more than one data blocks are different web sites.

53. The method of claim 51, wherein the destination websites indicated in at at least two of the more than one data blocks are the same web sites.

54. The method of claim 51, wherein the one or more data blocks include a default data block including destination data indicating a destination web site to be launched during playback of the media if the selected screen location and selected time portion of the user input does not match both the time portion indicated by the time duration data and the selectable display location indicated by the location data, respectively.

55. The method of claim 51, further comprising mapping the time offset from the beginning of the media content for each of the more than one data block to additional information provided in an advertisement data block.

* * * * *

(12) EX PARTE REEXAMINATION CERTIFICATE (10559th)
United States Patent
Robinson et al.

(10) Number: US 8,370,455 C1
(45) Certificate Issued: Mar. 31, 2015

(54) SYSTEMS AND METHODS FOR MAPPING MEDIA CONTENT TO WEB SITES (75) Inventors: Steven Robinson, Hermosa Beach, CA (US); Alexander Krassel, Encino, CA (US)

(73) Assignee: Xaxis, Inc., New York, NY (US)

Reexamination Request:
No. 90/020,071, Jun. 12, 2014

Reexamination Certificate for:
Patent No.: 8,370,455
Issued: Feb. 5, 2013
Appl. No.: 11/371,611
Filed: Mar. 9, 2006

(51) Int. Cl.
*G06F 15/16* (2006.01)
*G06F 17/22* (2006.01)
*G06F 3/0484* (2013.01)

(52) U.S. Cl.
CPC .......... *G06F 17/2247* (2013.01); *G06F 3/0484* (2013.01)

USPC .......... 709/218; 709/217; 709/219; 709/225; 709/226; 715/716; 725/112; 725/120; 725/87

(58) Field of Classification Search
None
See application file for complete search history.

(56) References Cited

To view the complete listing of prior art documents cited during the proceeding for Reexamination Control Number 90/020,071, please refer to the USPTO's public Patent Application Information Retrieval (PAIR) system under the Display References tab.

*Primary Examiner* — Jeffrey Carlson (57) ABSTRACT

Systems and methods for mapping viewable and non-viewable media to websites are disclosed. Mapping is executed through associated or embedded data, based upon frame and/or time segment of the media. The media-to-browser-destination-data (MBDD) may be embedded in media content, embedded in a transmitted signal, downloaded or pushed to a media playing device, or provided by a graphic overlay. Media players are disclosed that can process the MBDD to launch a browser to a selected web site.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7, 9, 34 and 45 are cancelled.

Claims 1, 6, 8, 25-26, 30, 36, 41 and 50-53 are determined to be patentable as amended.

Claims 2-5, 10-24, 27-29, 31-33, 35, 37-40, 42-44, 46-49 and 54-55, dependent on an amended claim, are determined to be patentable.

1. A method of mapping media content to a web site comprising:
   receiving media content at a media player in communication with a display screen, wherein the media content is viewable media content;
   receiving media-to-browser-destination-data, wherein the media-to-browser-destination-data includes (a) time duration data indicating a time portion of the viewable media content, *wherein the time duration data includes a time offset value and a duration value*; (b) location data indicating a selectable display location in the viewable media content that displays on the display screen during the time portion, wherein the selectable display location is a display location for which a destination web site is desired to be launched if selected by a user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server;
   processing the media-to-browser-destination-data into a collection of objects in the memory of the media player;
   playing the media content on the display screen in communication with the media player;
   during the display of the media content, receiving a user input from a user input device in communication with the media player, wherein the user input selects a selected screen location of media content being displayed on the display screen during a selected time portion of the displayed media content;
   determining whether the selected screen location and selected time portion of the user input match both the time portion indicated by the time duration data and the selectable display location indicated by the location data, respectively;
   if the selected screen location and selected time portion of the user input match both the time portion indicated by the time duration data and the selectable display location indicated by the location data, respectively, passing the unique lookup key value to the URL routing server at the URL routing server address;
   receiving the web site destination from the URL routing server to the media player; [and]
   launching a browser program to the web site destination such that the web site located at the web site destination is displayed on the display screen*; and*
   *receiving a pause command from the user input device and adjusting the time offset based on the pause command.*

6. The method of claim 5, wherein the pointing device is selected [rom] *from* the group consisting of a mouse, a keyboard, a remote control, a laser pointer, and a voice input device.

8. The method of claim [7] *1*, wherein the time offset value and the duration value are in a format selected from the group consisting of HH:MM:SS:FF, HH:MM:SS:hh, and a format using only frame numbers.

25. The method of claim 24, wherein the destination websites indicated in [at at least] two of the more than one data blocks are different web sites.

26. The method of claim 24, wherein the destination websites indicated in [at at least] two of the more than one data blocks are the same web sites.

30. A program code storage device, comprising:
   a machine-readable storage medium;
   machine-readable program code, stored on the machine-readable storage medium, the machine-readable program code having instructions to:
   receive media content at a media player in communication with a display screen, wherein the media content is viewable media content;
   receive media-to-browser-destination-data, wherein the media-to-browser-destination-data includes (a) time duration data indicating a time portion of the viewable media content, *wherein the time duration data includes a time offset value and a duration value*; (b) location data indicating a selectable display location in the viewable media content that displays on the display screen during the time portion, wherein the selectable display location is a display location for which a destination web site is desired to be launched if selected by a user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server;
   process the media-to-browser-destination-data into a collection of objects in the memory of the media player;
   play the media content on the display screen in communication with the media player;
   during the display of the media content, receive a user input from a user input device in communication with the media player, wherein the user input selects a selected screen location of media content being displayed on the display screen during a selected time portion of the displayed media content;
   determine whether the selected screen location and selected time portion of the user input match both the time portion indicated by the time duration data and the selectable display location indicated by the location data, respectively; if the selected screen location and selected time portion of the user input match both the time portion indicated by the time duration data and the selectable display location indicated by the location data, respectively, pass the unique lookup key value to the URL routing server at the URL routing server address; [and]

launch a browser program to the web site destination such that the web site located at the web site destination is displayed on the displayed screen; *and*

*receiving a pause command from the user input device and adjusting the time offset based on the pause command.*

36. The program *code* storage device of claim 30, further comprising displaying a graphical overlay on the display screen during display of the media content, wherein the selectable display location is included in a portion of the display screen where the graphical overlay is being displayed.

41. An apparatus comprising:
a media player;
a display screen in communication with the media player;
a user input device in communication with the media player;
a receiver in the media player *operable* to receive media content[, wherein the media content is displayed] *for display* on the display screen, and to receive media-to-browser-destination-data, wherein the media content is viewable media content;
a memory to store the media-to-browser-destination-data, wherein the media-to-browser-destination-data includes (a) time duration data indicating a time portion of the viewable media content, *wherein the time duration data includes a time offset value and a duration value*; (b) location data indicating a selectable display location in the viewable media content that displays on the display screen during the time portion, wherein the selectable display location is a display location for which a destination web site is desired to be launched if selected by the user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server;
a processor in communication with the memory and the receiver to process the media-to-browser-destination-data into a collection of objects in the memory and to process user input from the user input device, wherein the user input [selects] *is operable to select* a selected screen location of media content being displayed on the display screen during a selected time portion of the displayed media content, wherein the processor *is* further [determines] *operable to determine* whether the selected screen location and selected time portion of the user input match both the time portion indicated by the time duration data and the selectable display location indicated by the location data, respectively;
a transmitter *operable* to pass the unique lookup key value to the URL routing server at the URL routing server address if the selected screen location and selected time portion of the user input match both the time portion indicated by the time duration data and the selectable display location indicated by the location data, respectively;
wherein the receiver *is* further [receives] *operable to receive* the web site destination from the URL routing server; [and]

wherein the display screen [displays] *is operable to display* the web site located at the web site destination *and*

*said processor further being operable to, upon receipt of a pause command from the user input device, adjust the time offset based on the pause command.*

50. A method of mapping media content to a web site comprising:
receiving media content at a media player in communication with a display screen, wherein the media content is viewable media content;
receiving media-to-browser-destination-data, wherein the media-to-browser-destination-data includes (a) time duration data indicating a time portion of the viewable media content, *wherein the time duration data includes a time offset value and a duration value*; (b) location data indicating a selectable display location in the viewable media content that displays on the display screen during the time portion, wherein the selectable display location is a display location for which a destination web site is desired to be launched if selected by a user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server, wherein the media-to-browser-destination-data is downloaded by the media playing device or pushed to a media playing device in advance of the receiving the media content;
processing the media-to-browser-destination-data into a collection of objects in the memory of the media player;
playing the media content on the display screen in communication with the media player;
during the display of the media content, receiving a user input from a user input device in communication with the media player, wherein the user in put selects a selected screen location of media content being displayed on the display screen during the selected time portion of the displayed media content; determining whether the selected screen location and selected time portion of the user input match both the time portion indicated by the time duration data and the selectable display location indicated by the location data, respectively;
if the selected screen location and selected time portion of the user input match both the time portion indicated by the time duration data and the selectable display location indicated by the location data, respectively, passing the unique lookup key value to the URL routing server at the URL routing server address;
receiving the web site destination from the URL routing server to the media player; [and]
launching a browser program to the web site destination such that the web site located at the web site destination is displayed on the display screen; *and*
*receiving a pause command from the user input device and adjusting the time offset based on the pause command.*

51. A method of mapping media content to a web site comprising:
receiving media content at a media player in communication with a display screen, wherein the media content is viewable media content;
receiving media-to-browser-destination-data, wherein the media-to-browser-destination-data includes (a) time duration data indicating a time portion of the viewable media content, *wherein the time duration data includes a time offset value and a duration value*; (b) location data indicating a selectable display location in the viewable media content that displays on the display screen during the time portion, wherein the selectable display location is a display location for which a destination web site is desired to be launched if selected by a user during the time portion indicated by the time duration data; (c) a unique lookup key value that has been defined for the specific combination of (i) the time portion indicated in the time duration data and (ii) the selectable display location indicated by the location data; and (d) a URL routing server address of a URL routing server containing a web site destination to be launched when the unique lookup key value has been sent by the media player to the URL routing server, wherein the media-to-browser-destination-data is downloaded by the media playing device or pushed to a media playing device in advance of the receiving the media content;

processing the media-to-browser-destination-data into a collection of objects in the memory of the media player;

converting the collection of objects into an internal memory lookup table that includes one or more data blocks, wherein each of the more than one data blocks contains a set of destination data indicating a destination web site to be launched during playback of the media content when a particular unique lookup key value has been sent by the media player to the URL routing server;

playing the media content on the display screen in communication with the media player;

during the display of the media content, receiving a user input from a user input device in communication with the media player, wherein the user input selects a selected screen location of media content being displayed on the display screen during a selected time portion of the displayed media content;

determining whether the selected screen location and selected time portion of the user input match both the time portion indicated by the time duration data and the selectable display location indicated by the location data, respectively;

if the selected screen location and selected time portion of the user input match both the time portion indicated by the time duration data and the selectable display location indicated by the location data, respectively, passing the unique lookup key value to the URL routing server at the URL routing server address;

receiving the web site destination from the URL routing server to the media player; [and]

launching a browser program to the web site destination such that the web site located at the web site destination is displayed on the display screen; and

*receiving a pause command from the user input device and adjusting the time offset based on the pause command.*

52. The method of claim 51, wherein the destination websites indicated in [at at least] two of the more than one data blocks are different web sites.

53. The method of claim 51, wherein the destination websites indicated in [at at least] two of the more than one data blocks are the same web sites.

* * * * *